United States Patent [19]
Takata

[11] 3,746,101
[45] July 17, 1973

[54] EARTH WORKING MACHINE

[75] Inventor: Harry H. Takata, Minneapolis, Minn.

[73] Assignee: Raygo, Inc., Minneapolis, Minn.

[22] Filed: Feb. 1, 1971

[21] Appl. No.: 111,283

[52] U.S. Cl................... 172/112, 172/123, 172/705
[51] Int. Cl............................................ A01b 33/00
[58] Field of Search................... 172/112, 122, 123, 172/784, 785, 705; 111/7; 94/39, 40, 39.51

[56] References Cited
UNITED STATES PATENTS

| | | | |
|---|---|---|---|
| 3,224,347 | 12/1965 | Seaman............................ | 172/112 X |
| 2,795,176 | 6/1957 | O'Hara............................ | 172/112 X |
| 3,490,541 | 1/1970 | Adams, Jr........................ | 172/112 X |
| 3,538,987 | 11/1970 | Taylor............................. | 172/112 X |
| 2,657,620 | 11/1953 | Meeks............................. | 172/112 |
| 1,953,890 | 4/1934 | Allen et al....................... | 94/39.51 |

*Primary Examiner*—Robert E. Pulfrey
*Assistant Examiner*—Stephen C. Pellegrino
*Attorney*—Ira Milton Jones

[57] ABSTRACT

A soil stabilizing and conditioning machine with power driven traction wheels by which the machine is propelled forwardly while a horizontally disposed soil cutting and pulverizing rotor operating under a hood, and rotating in the direction to have its tines enter the fresh soil with a forward up-cutting action, resists forward propulsion of the machine and also mounds up the soil cut from the ground in front of the advancing rotor; an adjustable gate which forms the front wall of the hood and coacts with the uncut ground in front of the rotor precludes an excessive build-up of loose soil in front of the rotor, so that the presence thereof does not seriously increase the power required to propel the machine forward and drive the rotor, and when the machine is in operation and the hood is being dragged along the ground the load thus imposed upon the power source driving the traction wheels is substantially reduced by supporting part of the weight of the hood by a levitating connection between the hood and the chassis of the machine.

9 Claims, 9 Drawing Figures

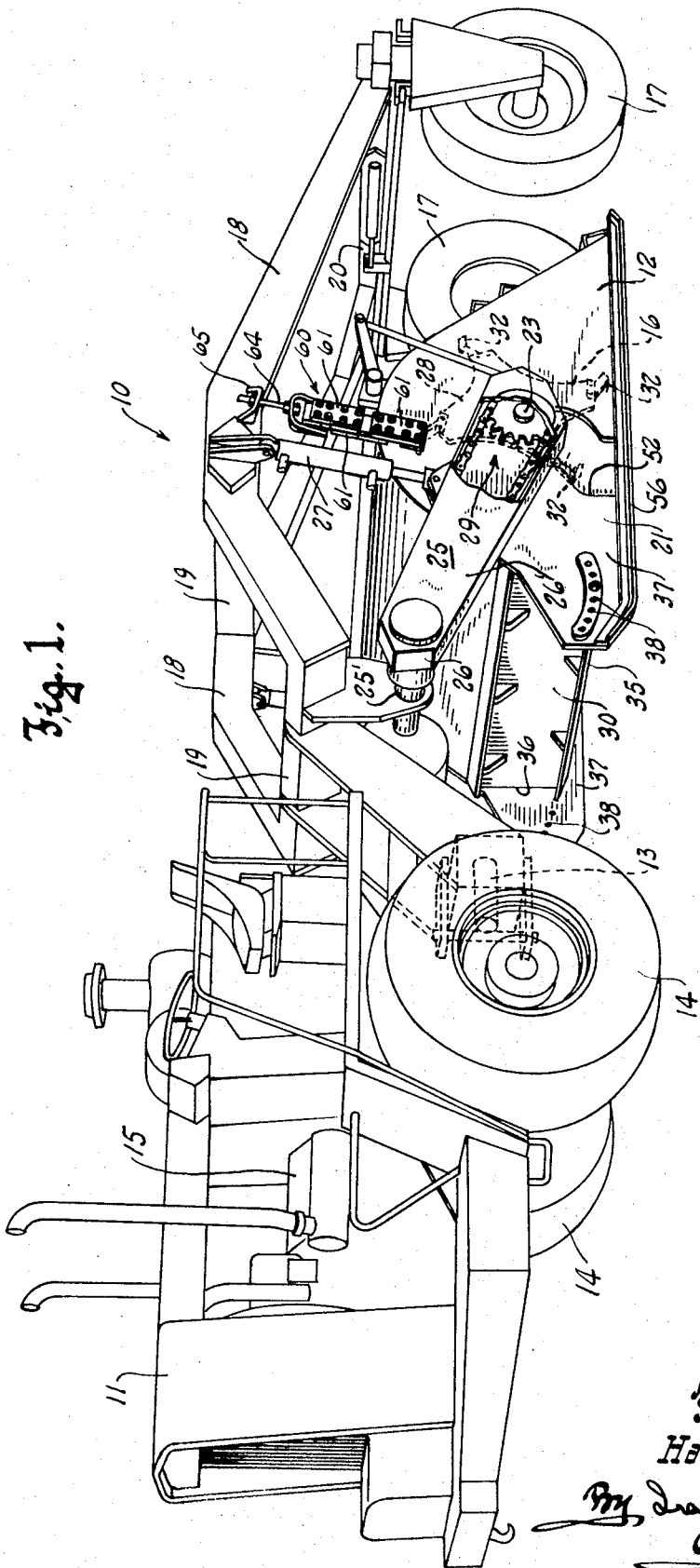

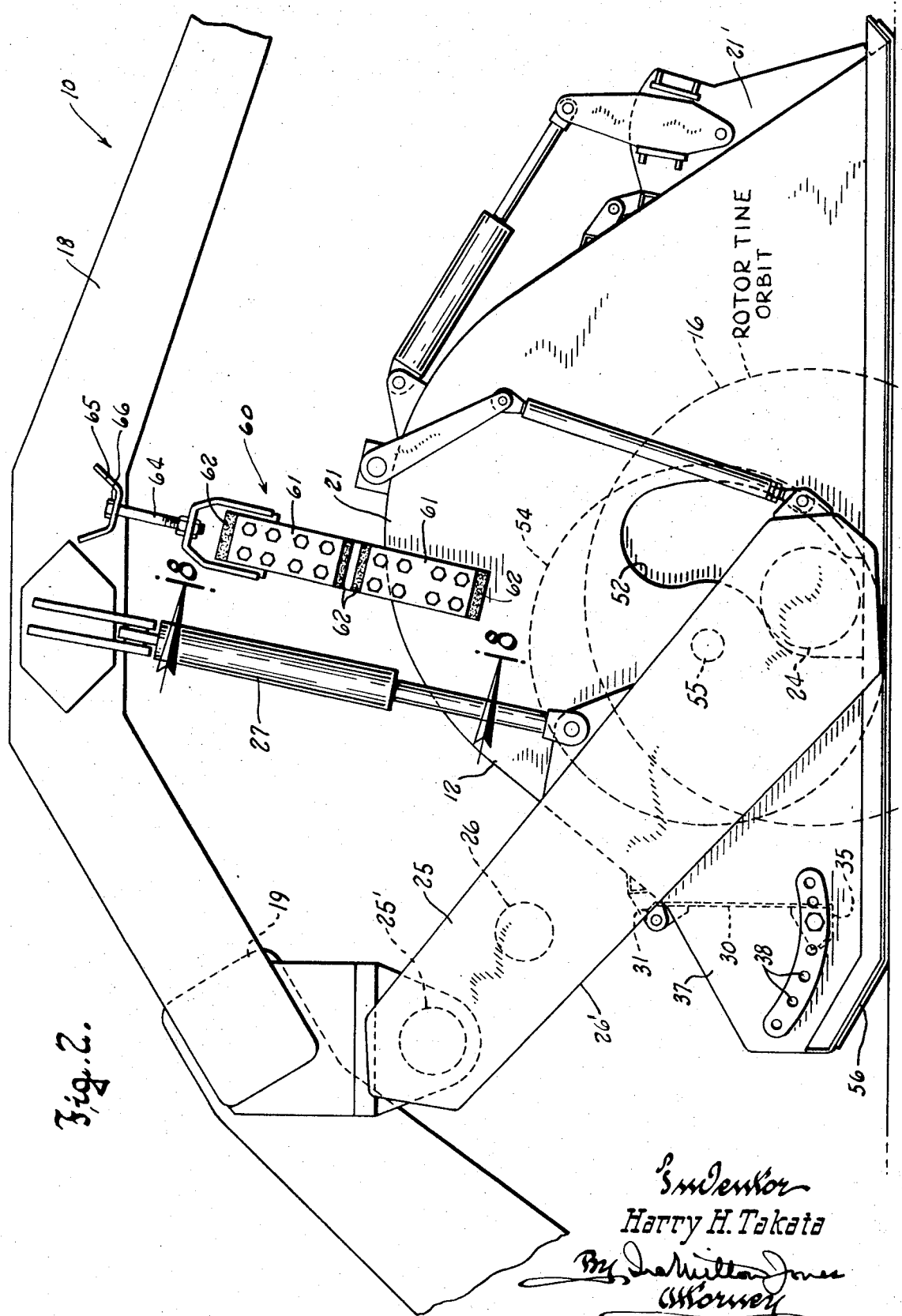

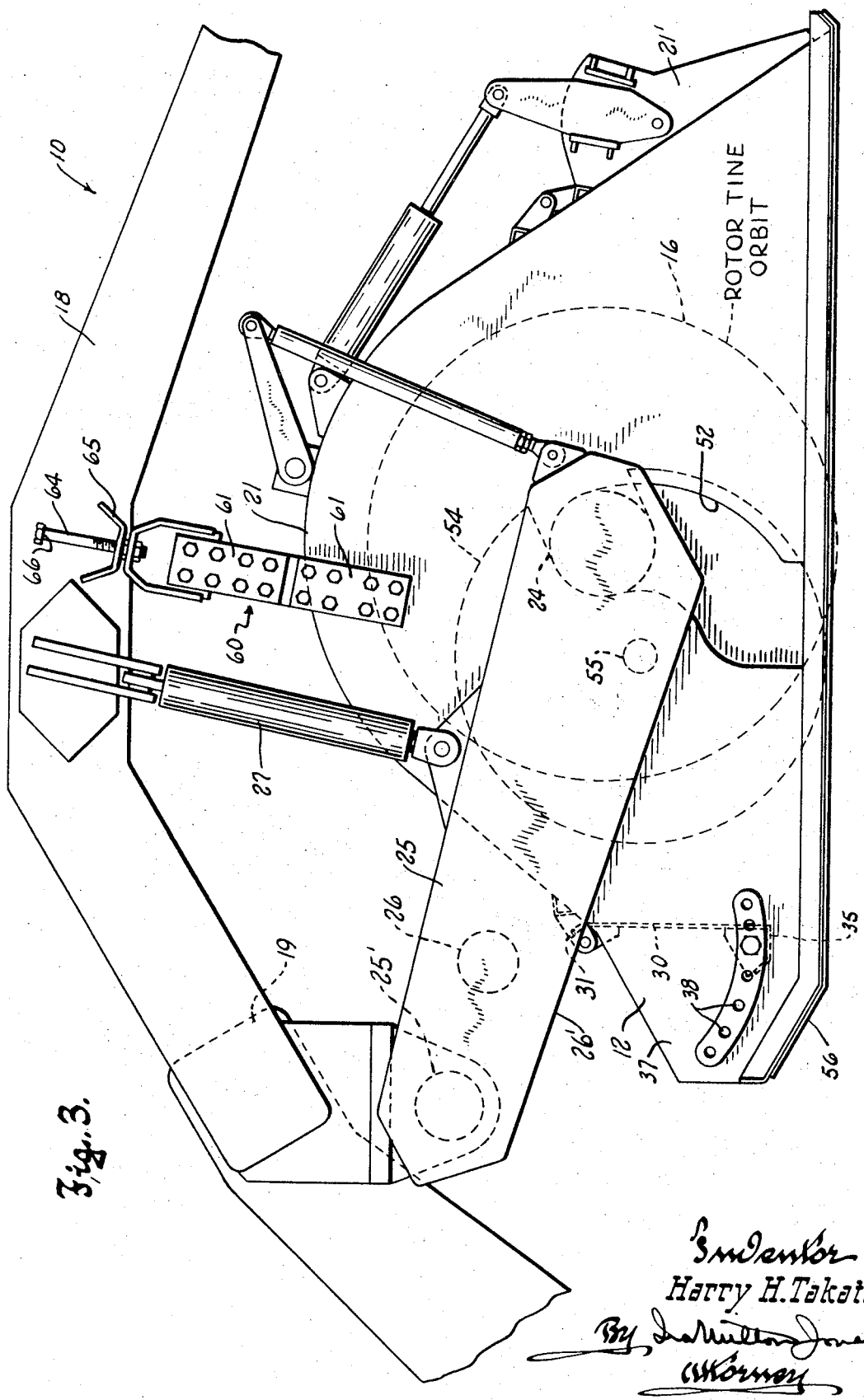

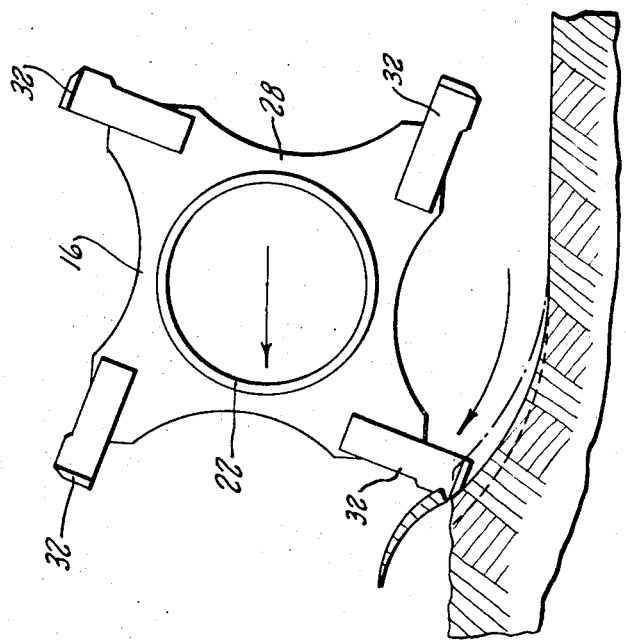
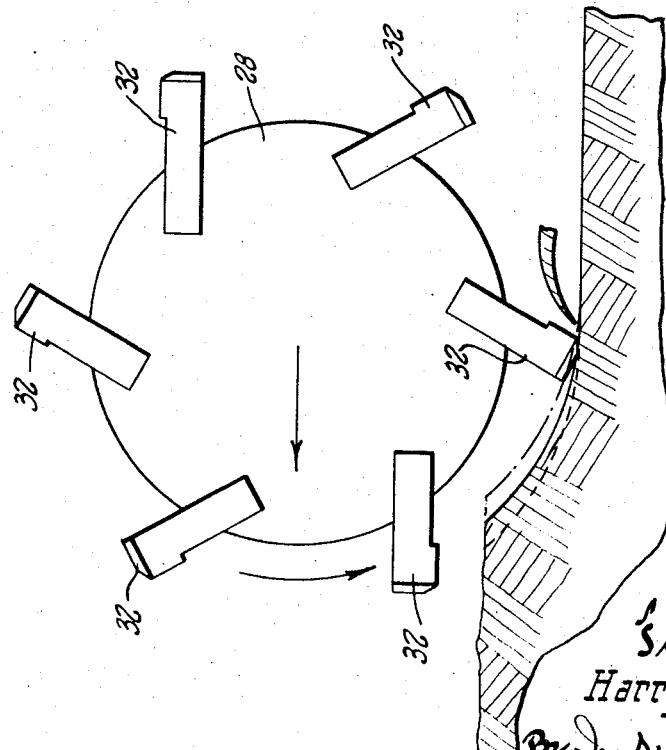

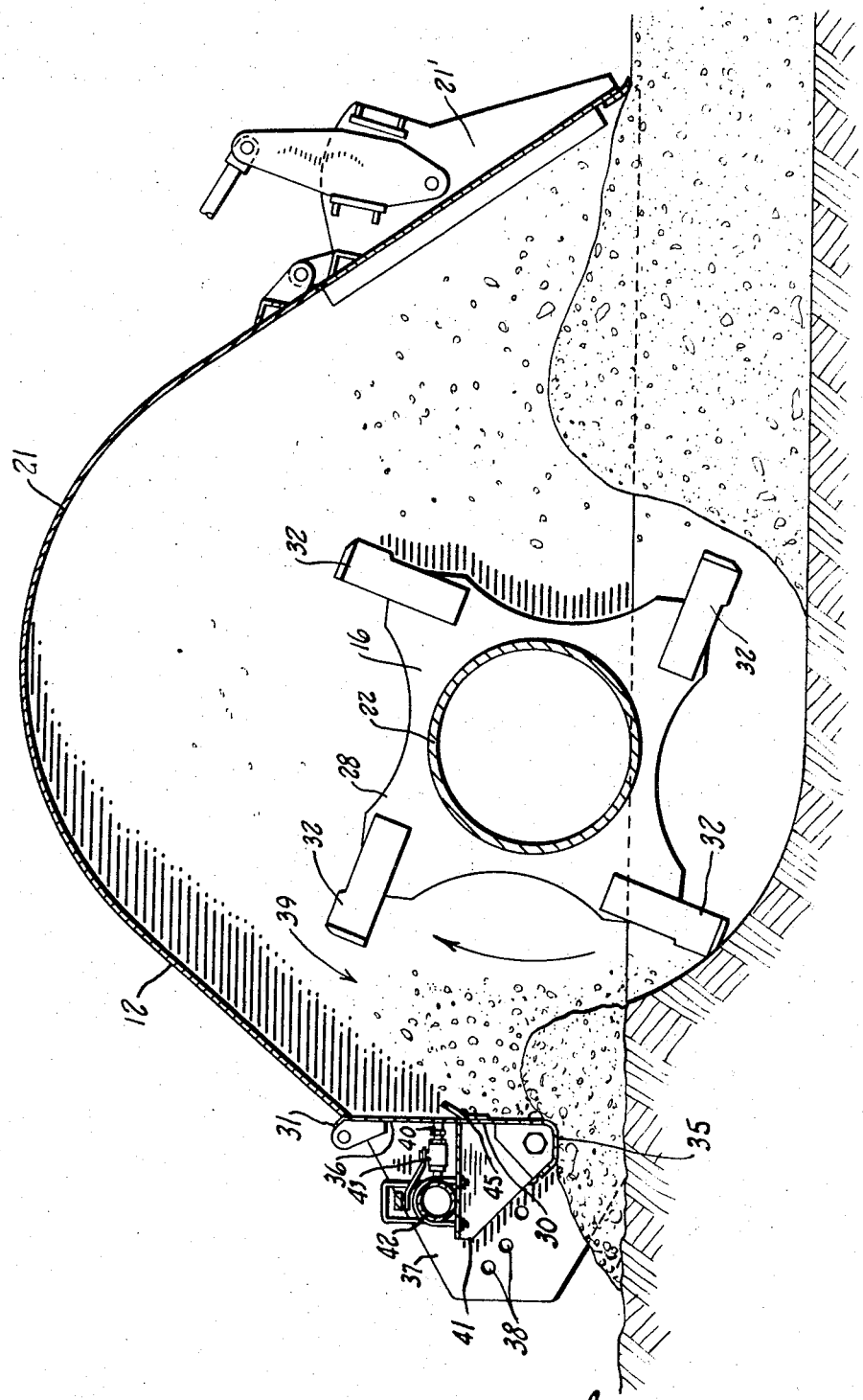

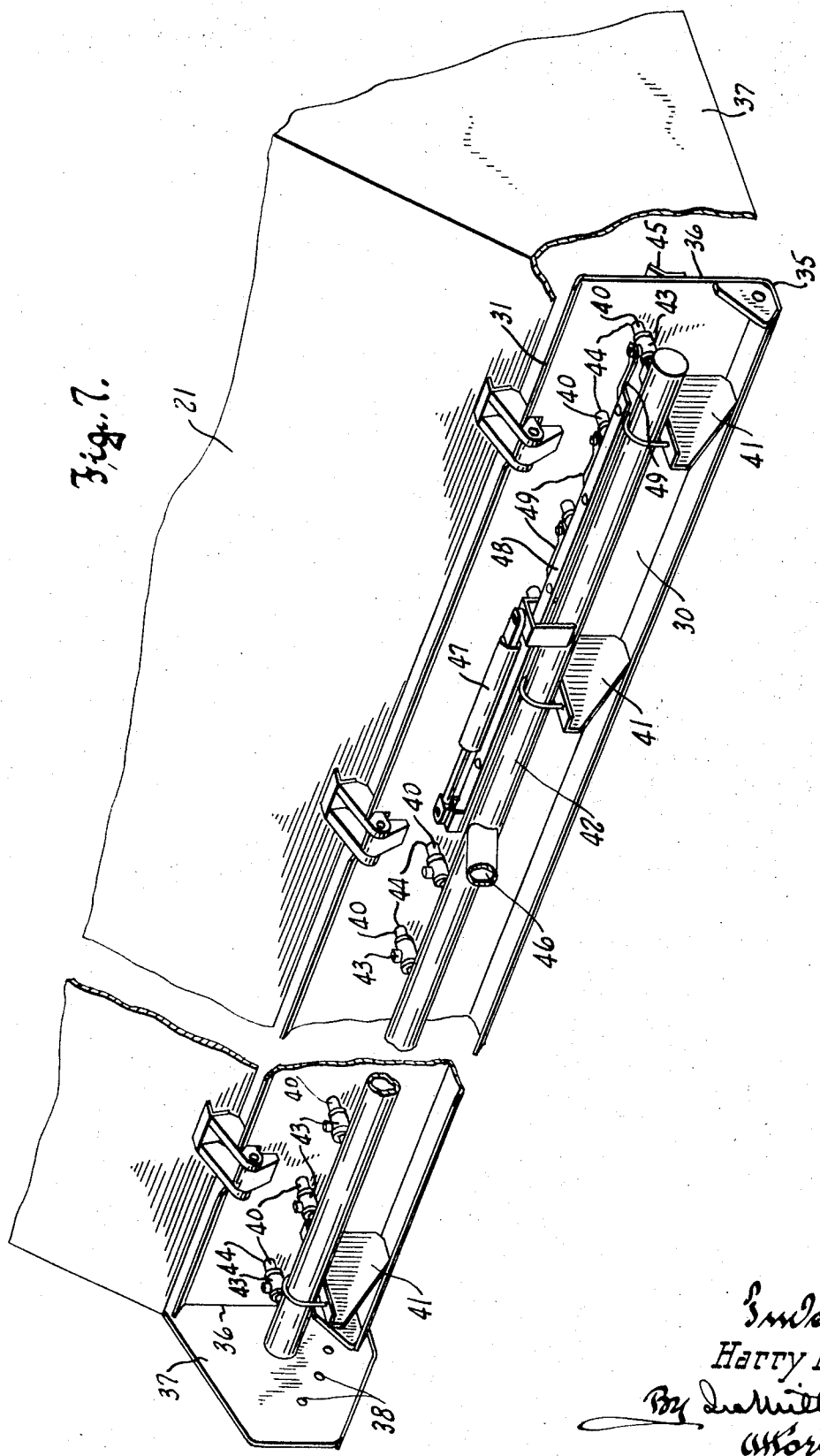

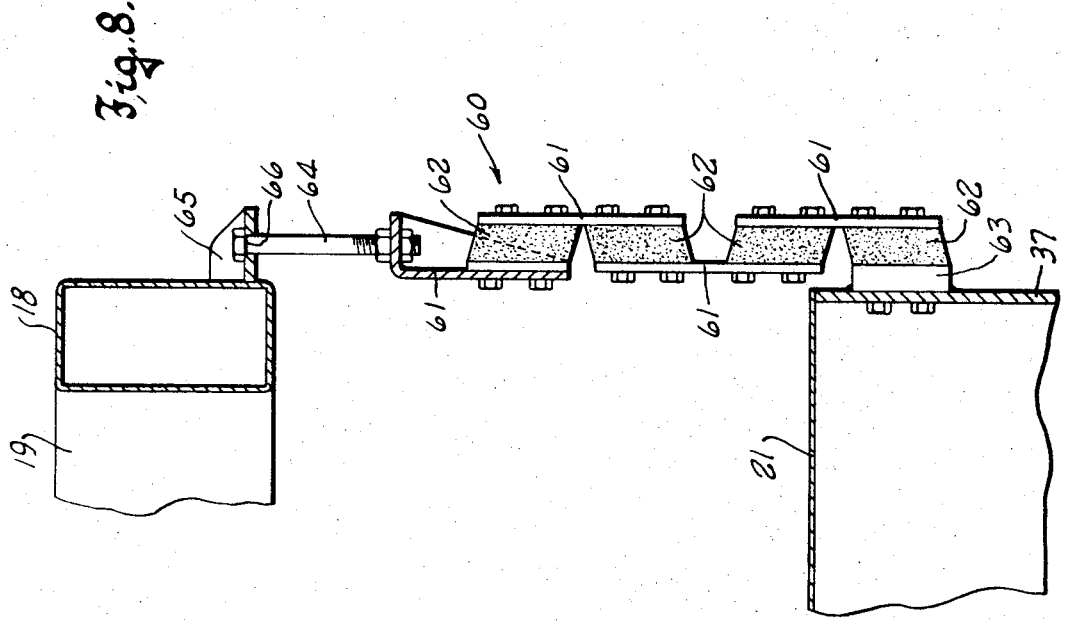
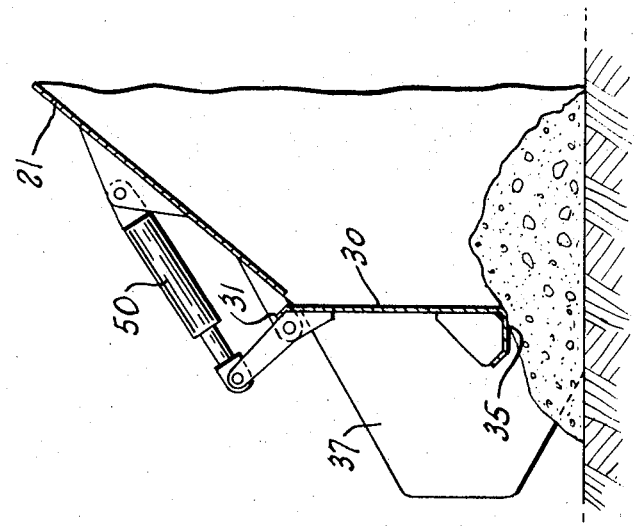

EARTH WORKING MACHINE

This invention relates to earth working equipment and refers more particularly to machines customarily known as soil stabilizers or conditioners. These machines, which are usually quite large, have a chassis supported on balloon tired wheels, certain of which are power driven to propel the machine forward, and a power driven horizontally disposed ground cutting and pulverizing rotor vertically adjustably supported from the chassis and operating under a hood that is connected with the chassis but rides upon the ground during operation of the machine.

Although machines of this type can be used for other purposes, such as agricultural tilling, they are primarily intended for use in road building, for which purpose they pulverize and stabilize the base materials in preparation for subsequent compaction and paving, and — if additives are to be added — they blend them into the base materials.

Conventionally the ground working rotor of the machine was driven in the same direction the traction wheels turn, so that the rotor tines attacked the fresh uncut soil in a downward and rearward direction as the machine traversed the ground. Experience has shown, however, that this downward and rearward cutting action has serious disadvantages especially in the larger machines. The tines had hoe-like cutting heads at their outer extremities which dug into the ground and cut out "chips" or pieces as the machine advanced. By virtue of the down-cutting action of the tines, the "chips" had maximum thickness at the start of each cut. In another way of putting it, the tines took large bites as they attacked the uncut ground, and this imposed severe shock loads upon the machine. Needless to say, such shock loads are objectionable.

But more important was the fact that the downward and rearward cutting action of the tines caused the machine to advance in a surging unsteady manner that made handling of the machine difficult and placed great strain upon the entire drive transmission connecting the engine with the traction wheels. The explanation for the surging, uneven advance of the machine resides in the fact that a downward and rearward cutting action of the rotor tines imparts a forward thrust to the machine and, in doing so, diminishes the load upon the transmission through which driving torque is transmitted to the traction wheels.

Since machines of this type employ a hydrostatic transmission to drive the traction wheels with a view to gaining maximum versatility and ease of speed adjustment to accommodate different soil conditions, any changes in load on the transmission result in objectionable variations in speed ratio between the driving and driven elements of the transmission. The forward thrust caused by the rotor produces a change in the load on the transmission and this results in a change in speed ratio between the driving and driven elements of the transmission in the direction which brings about a braking effect on the traction wheels that tends to offset the forward thrust imparted to the machine by the action of the rotor. By virtue of this braking effect, the advance of the machine is slowed and, as a result, the rotor tines take a smaller bite, thus reducing the ability of the rotor to impart forward thrust to the machine. The hydrostatic transmission reacts to that reduction, reduces the braking effect, and increases the propulsive effect of the traction wheels. This inevitable see-saw reaction of the hydrostatic drive transmission makes it impossible for the traction wheels to propel the machine forward at a steady rate.

Another objection to the down-cutting action of conventional machines of this type was that the larger "chips" or pieces were thrown rearward beyond the reach of the rotating tines and, as a result, the desired pulverization was not attained.

The present invention eliminates the objectionable consequences of the conventional down-cutting action of rotary soil stabilizing machines by the simple expedient of reversing the direction of rotor rotation and so disposing its tines that they cut the fresh soil with a forward up-going action. Not only does this greatly reduce the shock loads resulting from the tines biting into the uncut ground — since the "chips" or pieces that are sliced from the fresh soil are thin at the start of each cut — but, again more importantly, reversing the direction of rotor rotation eliminates the rotor-produced forward thrust on the machine. The load on the engine and on the entire drive transmission between it and the traction wheels, and also between the engine and the rotor, therefore remains constant, with the result that the machine moves forward at a steady rate and wear is reduced.

Another advantage gained by reversal of the cutting action of the rotor from down-cutting to up-cutting is more complete pulverization, because the larger pieces cannot escape the rotor tines, but instead are repeatedly struck thereby.

More thorough admixture and blending of additives with the loosened soil is still another advantage of the up-cutting rotor action, since the additives remain in the zone of action longer and travel farther with the advancing rotor before they are left in the wake of the machine.

It has also been found that, with the up-cutting rotor action, fewer tines are required to accomplish the work and this is reflected in reduced cutting effort and reduced tine replacement cost, both in labor and material.

However, it was discovered that the up-cutting rotor action had two serious drawbacks. One of these was that the rotor now produced a mound of soil in front of the rotor of such proportions that it greatly impeded the advance of the machine and, in so doing, objectionably raised the power requirements.

The other drawback concerns the hood in which the rotor operates. Since the hood rests upon the ground during work performing operation of the machine, and since the hood is very heavy, it takes considerable power to drag the hood along the ground. This load, added to the increased load resulting from the reverse rotation of the rotor and the consequent mound of soil in front of the rotor, placed an unacceptably high demand upon the engine and thereby created a problem that had to be solved if the advantages of reversing the direction of the rotor were to be attained. That problem has been solved by the present invention.

It can be said, therefore, that the significant contribution of this invention stems from the discovery of how to utilize the advantages of an up-cutting rotor without increasing the power required to drive the rotor and to propel the machine forward.

Briefly, this objective has been reached by providing an adjustable gate at the front of the hood in which the rotor operates, and levitating a substantial part of the weight of the hood. Levitating the hood reduces the frictional resistance incident to dragging it along the ground and thus materially reduces the power required to do so. The adjustable gate coacts with the uncut ground in front of the rotor to define the only exit from the front of the hood for the loose soil thrown out by the rotor tines, and it coacts with the tines to govern the volume of the loose soil that can accumulate in the hood in front of the rotor. By adjustment of this gate, the mound of loosened soil in front of the advancing rotor can be regulated and held to a size that does not objectionably impede the progress of the machine, regardless of the condition of the soil being worked.

The gate at the front of the hood also provides an ideal mount for nozzles through which liquid additives may be injected into the soil being worked, and for the ducts through which the nozzles are supplied, since the mixing and churning action in the zone between the gate and the orbit of the tines is by far the most active and conducive to thorough dispersion of the additive.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 1 is a perspective view of a soil stabilizing machine embodying this invention;

FIG. 2 is a side view of the hood in which the ground working rotor operates, with parts broken away and in section, and the rotor shown in its full depth cutting position;

FIG. 3 is a view similar to FIG. 2 but showing the rotor and the hood elevated for transport of the machine;

FIGS. 4 and 5 are diagrammatic end views of the rotor illustrating the comparison of the up-cutting rotor action of this invention, with the conventional down-cutting rotor action of the prior art;

FIG. 6 is a diagrammatic view illustrating how the adjustable gate coacts with the uncut ground in front of the rotor to regulate the depth of the mound of loose soil that can form in front of the advancing rotor and how the gate coacts with the orbit of the rotating tines to govern the volume of loose soil that can accumulate in the hood in front of the rotor;

FIG. 7 is a perspective view of the adjustable gate and the adjacent portion of the hood, especially showing the liquid additive nozzles, and one way of adjusting the gate;

FIG. 8 is a fragmentary sectional view taken on the plane of the line 8—8 in FIG. 2; and FIG. 9 diagrammatically illustrates remotely controlled adjustment of the gate.

Referring to the drawings, the numeral 10 designates generally a soil stabilizing or conditioning machine embodying this invention. The machine comprises a tractor unit 11 and a work performing unit 12, the chassis of which are articulately connected by a gimbal joint 13. The tractor unit is mounted on a pair of large balloon-tired drive wheels 14, and contains the power plant 15 — in this case a diesel engine. The work performing unit 12 which carries the ground working rotor 16, is supported at its front end by its connection 13 with the tractor, and at its rear end by a pair of steerable idler wheels 17 which can be located either outside or inside the swath of worked soil left in the wake of the advancing rotor.

Steering is effected through suitable hydraulic power cylinders, not shown, that swing the tractor unit about the vertical axis of the gimbal joint 13 under control of the operator who rides the tractor unit, and by similarly steering the rear wheels when occasion requires.

As is customary in machines of this type, power from the engine is delivered to the traction wheels 14 through a variable hydrostatic transmission (not shown). Such transmissions possess ideal speed adjustability and are very versatile, but the speed ratio between their driving and driven elements will vary with changes in the driven load. With the present invention, this objectionable characteristic of hydrostatic drive transmissions poses no problem, since there are no uncontrolled changes in load on the transmission driving the traction wheels.

The chassis of the work performing unit 12 comprises a frame having a pair of rigid parallel side arms 18 connected at the front by sturdy cross beams 19 and at the rear by a lighter cross rail 20. As seen in FIG. 1, the side arms 18 are arched to provide space therebeneath for the ground working rotor 16 of the machine and the hood 21 which covers the rotor. The rotor comprises a main shaft 22 which is preferably a heavy tube with journal shafts 23 projecting axially from its ends to be received in bearings 24 that are mounted in the free ends of a pair of arms 25 which are pivoted, as at 25', to the side arms 18 of the chassis of the work performing unit, to swing up and down about a horizontal axis. The arms 25 are rigidly connected by a stiff tube 26 so that, together with this tube, they form a sturdy, generally H-shaped yoke 26'. Hydraulic cylinders 27 suspended from the side arms 18 of the chassis and connected to the arms 25 provide for raising and lowering the yoke and the rotor carried thereby between a fully elevated position for transport of the machine, as shown in FIG. 3, and a fully lowered position, shown in FIG. 2, in which the rotor operates at maximum depth.

As in conventional ground working rotors, the rotor shaft has ground cutting and working tines 32 mounted thereon in axially and circumferentially spaced and staggered relationship. These tines are detachably secured to discs or plates 28 fixed to the rotor shaft at axially spaced intervals and have hoe-like cutting heads at their outer extremities. Preferably the tines are like those of the copending application Ser. No. 107-039, filed Jan. 18, 1971 now U.S. Pat. No. 3,702,638.

The arms 25 between which the rotor is mounted are hollow weldments and contain chain and sprocket drive transmissions, indicated generally by the numeral 29, through which the rotor is drivingly connected with driving sprockets fixed to shafts that are coaxial with the axis about which the yoke 26' swings. The inner ends of these coaxial shafts are connected through a differential with a drive shaft driven directly by the engine.

As explained hereinbefore, the direction in which the rotor is driven causes its tines to dig into the fresh soil with a forward up-cutting action, as depicted in FIG. 4, rather than the down-cutting rearward action of the prior art depicted in FIG. 5. Comparison of these two views graphically illustrates the advantages of the up-cutting rotor action. With the conventional down-cutting action (FIG. 5) the cutting head of each tine attacks the unbroken surface of the fresh soil in front of the advancing rotor and, as a result, the "chip" or piece cut off by the tine has maximum thickness at the start of the cut. This imposes a severe shock load upon the machine and tends to lift the rotor out of the ground.

Also, large unbroken "chips" or clumps of soil are left unbroken since the rearward motion of the tines as they move through the lower portion of their orbit, kicks these heavier pieces beyond the reach of the tines, and hence out of the zone of action.

By contrast, the forward up-cutting action of the rotor employed in this invention eliminates the objectionable shock loads, since the "chips" cut from the fresh soil have practically no thickness at the start of the cut; all loose material lies in the path of the advancing rotor to be repeatedly acted upon by the tines to thus assure complete pulverization and thorough blending of the pulverized material. This latter advantage is especially significant where additives are to be incorporated in the worked soil, since as will be appreciated, the additives that are dropped in the path of the advancing machine will be carried along in the mixing chamber provided by the hood until they are thoroughly blended with the soil.

The up-cutting rotor action further requires less cutting effort and enables a rotor with fewer tines to be used without loss of performance. Most important, though, the propulsion effect of the down and rearward cutting action is eliminated and, with it, the objectional surging in the advance of the machine.

But, as pointed out hereinbefore, the up-cutting rotor action did create a problem that had to be solved. As can be appreciated, the forward and upward motion of the rotor tines threw the loose soil in front of the advancing rotor and often built up a mound so large that great difficulty was experienced in keeping the machine moving forward. That problem was solved by the provision of an adjustable gate 30 at the front of the hood 21.

The gate 30 is a structural weldment, substantially rectangular in shape with parallel top and bottom edges 31 and 35, respectively, and end or side edges 36. The gate fits between the side walls 37 of the hood and has its top edge hingedly connected to the top wall of the hood with the hinge axis so located that as the gate is swung about that hinge connection, its bottom edge moves towards and from the ground level and the orbit of the rotor tines. An arcuate row of holes 38 in each side wall of the hood enables the bottom edge of the gate to be bolted to the side walls with the gate in any selected one of a number of position of adjustment, all of which lie forwardly of its pendant position shown in the drawings, and in which the bottom edge of the gate is at the lowermost limit of adjustment.

Since the gate forms the front wall of the hood, it coacts with its side walls and the surface of the fresh uncut ground in front of the rotor to define the only exit at the front of the hood for loosened soil. Thus by adjustment of the gate, the depth of the mound of loose soil that can form in front of the hood and rotor can be held within permissible proportions for a wide variety of soil conditions and depths of rotor cut.

The gate also coacts with the side walls of the hood and the rotor to define a mixing zone 39 in which the loose soil is churned and thoroughly pulverized (see FIG. 6) before being carried over the rotor to the rear of the hood where the customary adjustable rear gate 21' levels the worked soil. The adjustability of the gate 30 enables the volume of this mixing zone 39 to be adjusted to different soil conditions and, in this sense, coacts with the rotor to govern the amount of loose soil in the hood in front of the rotor.

Since the pulverizing action is most effective in the mixing zone 39 between the gate 30 and the rotor, the gate provides an ideal support for a row of nozzles 40 through which liquid additives can be introduced into the soil being worked. For this purpose, the gate has brackets 41 fixed to its front or exterior face to which a manifold pipe 42 is secured. The nozzles are supportingly connected to and communicated with this pipe through valves 43. In line with each nozzle there is a hole 44 through the gate, and to protect the nozzles from contact with the soil being thrown about in the mixing zone 39, a shield or deflector 45 is secured to the inner face of the gate below the row of holes 44.

A pipe 46 projecting laterally from the pipe 42 provides an inlet to the manifold through which liquid additive may be introduced, and by selectively opening the valves 43, the additive may be sprayed into different sections of the mixing zone 39. Though the valves could be manually manipulated, it is preferable to do so by remotely controlled hydraulic cylinders 47. Two or more such control cylinders can be mounted on the gate, each having its ram connected with several of the valves through links 48 which, in turn, are connected to the handles 49 of the valves.

A remotely controlled power cylinder 50 can also be provided to adjust the gate 30, as shown in FIG. 9, in which event the free edge of the gate would, of course, not be bolted to the side walls of the hood.

As now fully explained, the build-up of loose soil in front of the rotor can be controlled so that its presence is by no means an insurmountable obstacle in the path of the advancing rotor, or even the cause of a seriously increased power requirement.

By the same token, the load imposed upon the engine in dragging the hood 21 along the ground, is held within acceptable limits by levitating a substantial part of the weight of the hood. The manner in which this is done will now be described.

To enable the rotor to be driven despite the fact that it operates within or under the hood 21, the journal shafts 23 at the ends of the rotor must pass through the side walls of the hood; and to enable the rotor to be vertically adjustable with respect to the hood — as needed to have it cut to different selected depths — the openings in the side walls of the hood through which the rotor journals 23 pass are arcuate slots 52.

As will be appreciated, the arcuate length of the slots 52 must be sufficient to accommodate the full range of vertical adjustment of the rotor while the hood sets on the ground, which range extends from a position in which the rotor is lifted a substantial distance off the ground to a fully lowered position in which the rotor cuts to its maximum depth. When the rotor is raised a short distance above the ground, its journals 23 contact the upper closed ends of the slots 52 so that, upon further elevation of the rotor, the hood too will be lifted.

But the hood must not be free to teeter about the journals as it is lifted. Accordingly, the hood side walls are linked to the journals 23 by levers 54, and the curvature of the arcuate slots 52 is concentric to the points 55 at which the levers 54 are pivoted to the side walls of the hood. By having the links 54 in the shape of discs, the slots 52 are closed in all relative positions of the hood and rotor.

During descent of the hood from its raised transport position, and at a point somewhat above contact with the ground of its skids 56 — which extend along the bottom edges of its side walls — a significant part of the weight of the hood is borne by levitating connections 60 between the side walls of the hood and the chassis arms 18 thereabove. Each of these connections comprises overlying flatwise and endwise spaced metal plates 61 connected through blocks of rubber 62 to form an elastic tension member, one end of which is fixed, as at 63, to the hood side wall. The other end of this tension member has a tension rod 64 extending therefrom and freely slidably received in a hole in a bracket 65 fixed to the chassis arm 18. An abutment 66 on the outer end of the tension rod engages the top of the bracket 65 when the hood has descended to a position somewhat short of contact with the ground. Hence, further descent of the hood places the levitating connection in tension, with the result that much of the weight of the hood is carried by the chassis and the frictional resistance to its being dragged along the ground is greatly less than it would be if the full weight of the hood was borne by its skids setting on the ground.

Because the tension rod is free to slide through the hole in the bracket 65, and has sufficient length, there is adequate lost motion between the levitating connections 60 and the chassis arms 18 to enable the hood to be lifted to its transport position, without interference from the levitating connections and without rendering them ineffective to support the hood when it is lowered onto the ground.

Preferably, the tension rod 64 is a long bolt having its threaded end adjustably attached to the levitating connection 60; the head of the bolt forming the abutment 66.

Those skilled in the art will appreciate that the invention can be embodied in forms other than as herein disclosed for purposes of illustration.

The invention is defined by the following claims:

I claim:

1. In an earth working machine having
   a. a chassis supported in part by traction wheels by which the machine is propelled forwardly during work performing operation of the machine,
   b. a horizontally disposed rotor vertically adjustably supported from the chassis and having soil cutting and pulverizing tines thereon,
   c. a hood over the rotor to provide a mixing chamber in which pulverization of the soil acted upon by the rotor tines takes place, the hood having side walls with skids on the bottom edges thereof which ride upon the ground during work performing operation of the machine,
   d. a power plant on the chassis, and
   e. hydrostatic drive means for drivingly connecting the traction wheels with the power plant, the improvement which comprises the combination of:

A. means drivingly connecting the rotor with the power plant and by which rotation is imparted to the rotor in the direction opposite that in which the traction wheels turn in propelling the machine forwardly, whereby
      1. the entry of the rotor tines into the unworked ground as the rotor is advanced by the forward propulsion of the machine opposes the torque applied to the traction wheels by the hydrostatic drive means, so that the torque applied to the traction wheels by said drive means is steady and the advance of the machine is likewise steady and surge-free, and
      2. the action of the rotor tines causes the soil being worked to mound up in front of the rotor and thereby add to the power required to drive the rotor and propel the machine forward in proportion to the size of the mound; and
   B. a gate adjustably mounted on the hood forming a front wall for the hood and coacting with the adjacent side walls of the hood and the uncut ground in front of the rotor to define the only exit at the front of the hood through which loose soil can be expelled,
      said gate having a bottom edge which is raised and lowered through a predetermined range by adjustment of the gate and which bottom edge forms the top of the exit so that the depth to which the expelled loose soil can mound up in front of the advancing rotor depends upon the position of adjustment of the gate; and
   C. means for securing the gate in a selected position of adjustment, so that its coaction with the uncut ground may be adapted to different soil conditions and to the depth to which the rotor has been adjusted to cut.

2. The improvement in earth working machines set forth in claim 1, wherein said means for securing the gate in a selected position of adjustment comprises remotely controlled power means connected with the gate and operable to move the same to any position within its range of adjustment and to hold the same in such position.

3. The improvement in earth working machines set forth in claim 1, wherein the hood has a top wall as well as side walls,
   and wherein the gate has parallel top and bottom edges and spans the distance between the side walls of the hood with the opposite ends of the gate in juxtaposition to the side walls of the hood,
   and wherein the adjustable mounting of the gate comprises hinge means connecting the top edge of the gate to the top wall of the hood, and by which hinge means the gate is suspended for movement from a pendant position at which its bottom edge is at the lowermost limit of its range of adjustment to an inclined position at which its bottom edge is at a higher elevation,
   and wherein the means for securing the gate in a selected position of adjustment comprises means for securing the ends of the gate to the side walls of the hood.

4. The improvement in earth working machines set forth in claim 1, further characterized by
   nozzle means on the gate for injecting a liquid additive into the zone between the gate and the orbit of the rotor tines for admixture with the soil being thrown about and pulverized in said zone by the action of the rotor tines.

5. The improvement in earth working machines set forth in claim 4, wherein said nozzle means comprises a series of separate nozzles spaced lengthwise of the gate,
and further characterized by duct means for delivering a liquid additive to said nozzles and valve means for controlling connection of said duct means with the nozzles, whereby liquid additive may be delivered simultaneously to all or a selected number of said nozzles.

6. The improvement in earth working machines set forth in claim 1, further characterized by:
means providing a towing connection between the hood and the chassis of the machine and through which the hood is dragged along the ground by the advancing machine during performance of its work, said towing connection accommodating up and down movement of the hood as required by variations in elevation of the ground being traversed, and
resiliently yieldable means supportingly connecting the hood with a portion of the chassis above the hood through which part of the weight of the hood is borne by the chassis when the hood is in contact with the ground to thereby diminish the frictional force which resists advance of the machine due to the hood being dragged along the ground,
whereby load imposed upon the power plant in effecting forward propulsion of the machine is reduced.

7. In an earth working machine having
a. a chassis supported in part by traction wheels by which the machine is propelled forwardly during work performing operation of the machine,
b. a horizontally disposed rotor vertically adjustably supported from the chassis and having soil cutting and pulverizing tines thereon,
c. a hood over the rotor to provide a mixing chamber in which pulverization of the soil acted upon by the rotor tines takes place,
the hood having side walls with skids on the bottom edges thereof which ride upon the ground during work performing operation of the machine,
d. a power plant on the chassis, and
e. hydrostatic drive means for drivingly connecting the traction wheels with the power plant,
the improvement which comprises the combination of:
A. means drivingly connecting the rotor with the power plant and by which rotation is imparted to the rotor in the direction opposite that in which the traction wheels turn in propelling the machine forwardly,
whereby the entry of the rotor tines into the unworked ground as the rotor is advanced by the forward propulsion of the machine opposes the torque applied to the traction wheels by the hydrostatic drive means, so that the torque applied to the traction wheels by said drive means is steady and the advance of the machine is likewise steady and surge-free;
B. means providing a towing connection between the hood and the chassis of the machine and through which the hood is dragged along the ground by the advancing machine during performance of its work,
said towing connection accommodating up and down movement of the hood relative to the chassis and to the rotor and independently of them as required by variations in elevation of the ground being traversed; and
C. resiliently yieldable means supportingly connecting the hood with a portion of the chassis through which part of the weight of the hood is borne by the chassis when the hood is in contact with the ground to thereby diminish the frictional force which resists advance of the machine due to the hood being dragged along the ground,
whereby the load imposed upon the power plant in effecting forward propulsion of the machine is reduced.

8. The improvement in earth working machines set forth in claim 7,
1. wherein the vertically adjustable support for the rotor comprises a pair of arms pivoted to the chassis to swing about a common horizontal axis located forwardly of the rotor and having the ends of the rotor journaled in said arms, and hydraulic cylinder means connecting said arms with the chassis and by which said arms and the rotor may be raised and lowered,
2. wherein the means providing a towing connection between the hood and the chassis comprises said pair of arms and lever means connecting said arms with the hood,
the connections of the lever means with the arms and with the hood being located to accommodate up and down adjustment of the rotor with respect to the hood,
3. wherein upward adjustment of the rotor with respect to the hood is limited so that upon elevation of the rotor by said pair of arms far enough to lift the rotor off the ground, the hood is likewise lifted off the ground,
4. wherein said resiliently yieldable means has a load carrying connection with the chassis and another load carrying connection with the hood, and
5. wherein one of said connections incorporates lost motion which relieves the resiliently yieldable means of load when the hood is lifted off the ground.

9. The improvement in earth working machines set forth in claim 7, further characterized by:
a gate adjustably mounted on the hood forming a front wall for the hood and coacting with the adjacent side walls of the hood and with the uncut ground in front of the rotor to define the only exit at the front of the hood through which loose soil can be expelled, so that by adjustment of the gate the size of the mound of loose soil that can be built up in front of the rotor by virtue of its forward and upward cutting action can be limited.

* * * * *